United States Patent
Laurberg

(10) Patent No.: US 9,394,884 B2
(45) Date of Patent: Jul. 19, 2016

(54) OPERATING A WIND TURBINE WITH MULTIPLE TEMPERATURE SENSORS

(71) Applicant: Siemens Aktiengesellschaft, München (DE)

(72) Inventor: Hans Laurberg, Århus C (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 535 days.

(21) Appl. No.: 13/955,412

(22) Filed: Jul. 31, 2013

(65) Prior Publication Data
US 2014/0056706 A1 Feb. 27, 2014

(30) Foreign Application Priority Data
Aug. 24, 2012 (EP) ..................... 12181668

(51) Int. Cl.
*F03D 7/04* (2006.01)
*F03D 7/02* (2006.01)
*F03D 11/00* (2006.01)

(52) U.S. Cl.
CPC ............... *F03D 7/042* (2013.01); *F03D 7/028* (2013.01); *F03D 11/0091* (2013.01); *F05B 2270/1091* (2013.01); *F05B 2270/303* (2013.01); *F05B 2270/404* (2013.01); *Y02E 10/722* (2013.01); *Y02E 10/723* (2013.01)

(58) Field of Classification Search
CPC ............... F03D 7/042; F05B 2270/303; F05B 2270/404
See application file for complete search history.

(56) References Cited

U.S. PATENT DOCUMENTS

| | | | | |
|---|---|---|---|---|
| 8,118,536 | B2* | 2/2012 | Krauss | F03D 11/0008 415/1 |
| 8,190,394 | B2* | 5/2012 | Davis | F03D 11/0008 702/179 |
| 8,738,192 | B2* | 5/2014 | Uphues | F03D 7/0224 290/44 |
| 2010/0270798 | A1* | 10/2010 | Poulsen | F03D 7/0224 290/44 |

FOREIGN PATENT DOCUMENTS

| | | |
|---|---|---|
| EP | 2166226 A1 | 3/2010 |
| EP | 2309122 A1 | 4/2011 |
| WO | WO 2012041327 A2 | 4/2012 |

* cited by examiner

*Primary Examiner* — Ninh H Nguyen

(57) ABSTRACT

A method of operating a wind turbine and a wind turbine employing this method are provided. The method includes measuring an operating temperature in a plurality of components of the wind turbine yielding a plurality of measured operating temperatures. Each measured operating temperature is subtracted from a predefined maximum allowable operating temperature for the corresponding component of the wind turbine thereby yielding a plurality of operating temperature margins. A minimum operating temperature margin among the plurality of operating temperature margins is determined and at least one operating parameter of the wind turbine is set in accordance with the minimum operating temperature margin.

10 Claims, 2 Drawing Sheets

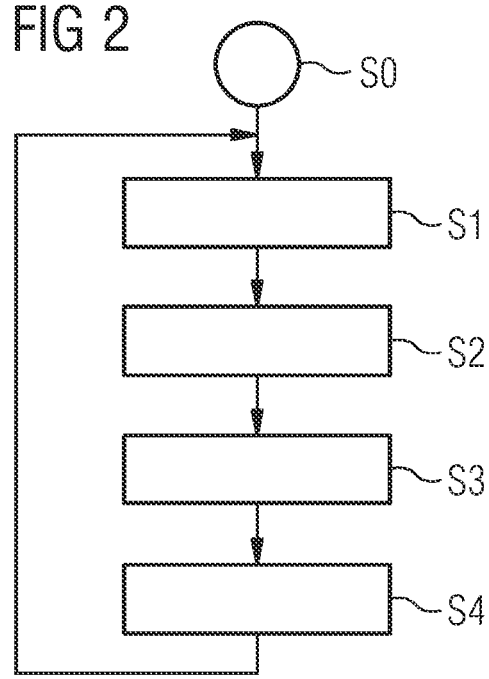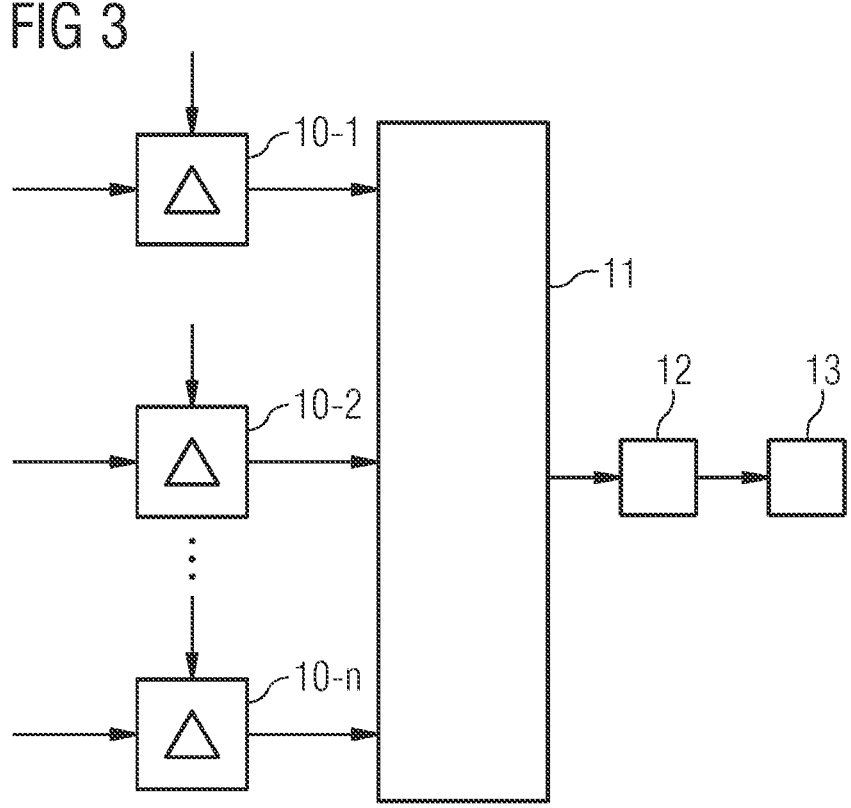

OPERATING A WIND TURBINE WITH MULTIPLE TEMPERATURE SENSORS

CROSS REFERENCE TO RELATED APPLICATIONS

The present application claims priority to European Patent Office application No. 12181668.0 EP filed Aug. 24, 2012, the entire content of which is hereby incorporated herein by reference.

TECHNICAL AREA

A method of operating a wind turbine comprising a plurality of temperature sensors and a wind turbine are provided.

TECHNICAL BACKGROUND

In wind turbines the operating temperatures of several different components need to be monitored. For each such component there may be a maximum allowable operating temperature. Generally exceeding this maximum allowable operating temperature of a component may damage or wear down the component in question which may cause turbine downtime for maintenance or a shortened life expectancy of the wind turbine. Thus, maintaining all operating temperatures of the various critical components of the wind turbine within their respective allowable ranges is a prerequisite for achieving a maximum profitability of the wind turbine.

Usually wind turbines are constructed such that the wind turbine is shut down if one component exceeds its maximum allowable operating temperature. This control strategy is simple and effective, however, leads to some turbine downtime. This turbine downtime again reduces overall power production and thus profitability of the wind turbine.

Other control strategies include providing a dedicated control algorithm for one or more components of the wind turbine that may be controlled with respect to the power dissipated in the component. However, these algorithms have to be tailored for each specific such component and may not be used for other components which greatly increases implementation complexity. In addition there may be some components of the wind turbine that cannot be controlled individually in accordance with their operating temperature.

SUMMARY OF THE INVENTION

An enhanced method of operating a wind turbine is provided. The method comprises steps of:
  measuring an operating temperature in a plurality of components of the wind turbine yielding a plurality of measured operating temperatures;
  for each measured operating temperature, subtracting the measured operating temperature from a predefined maximum allowable operating temperature for the corresponding component of the wind turbine thereby yielding a plurality of operating temperature margins;
  determining a minimum operating temperature margin among the plurality of operating temperature margins; and
  setting at least one operating parameter of the wind turbine in accordance with the minimum operating temperature margin.

The control method may be implemented easily and allows for controlling the operating temperatures of all critical components of the wind turbine while keeping turbine downtimes at a minimum. By setting an operating parameter of the wind turbine, the control method influences the power dissipation in all components of the wind turbine. Thus, the new control method is applicable to all critical components of the wind turbine reducing implementation complexity of the method. Furthermore, the method may be implemented such that the at least one operating parameter of the wind turbine will be gradually modified anticipating a potential shutdown of the whole wind turbine when a hard limit was reached in the prior art and reducing heat production beforehand. This will lead to a greater overall power production of the wind turbine while still maintaining the operating temperatures of the various components within their respective maximum allowable operating temperatures.

The method may further comprise a step of low-pass filtering the minimum operating temperature margin prior to setting the at least one operating parameter of the wind turbine. The low-pass filtering removes spurious momentary measured operating temperatures which may affect the control of the wind turbine. Since the operating temperatures of the components will generally vary slowly over time, the operating temperatures can be measured comparatively often such that the method can react to notable changes of the operating temperatures even when applying the low-pass filtering. The low-pass filtering of the minimum operating temperature margin may be carried out in at least three equivalent ways which are all embraced in the scope of the claimed invention:
  a) Low-pass filtering each of the measured operating temperatures prior to subtracting the predefined maximum allowable operating temperature;
  b) Low-pass filtering each of the plurality of operating temperature margins prior to determining the minimum operating temperature margin;
  c) Low-pass filtering the minimum operating temperature margin.

Option c) provides for the lowest cost of implementation. It may also be combined with one of options a) and b).

Preferably the at least one operating parameter of the wind turbine includes a power setpoint of the wind turbine. The power setpoint determines how much power the wind turbine produces and has a strong influence on the power dissipation in the components of the wind turbine. However, other operating parameters of the wind turbine may be alternatively or additionally set, e.g. a rotating speed of the rotor of the wind turbine, a pitch angle of the rotor blades of the wind turbine and others.

The method may further comprise comparing the minimum operating temperature margin to a predefined threshold operating temperature margin and setting the at least one operating parameter of the wind turbine in accordance with a result of the comparison.

More specifically the at least one operating parameter of the wind turbine may be modified if the minimum operating temperature margin decreases below the predefined threshold operating temperature margin and left unchanged else. In such an implementation the operating parameters will be set for normal operation regardless of the operating temperatures of the components of the wind turbine as long as the minimum operating temperature margin is greater than the predefined threshold operating temperature margin because all measured operating temperatures are well within their respective allowable intervals. However, if the minimum operating temperature margin is less than the predefined threshold operating temperature margin, the wind turbine will be operated also considering the operating temperatures of the components of the wind turbines in order to avoid violation of one of the maximum allowable operating temperatures by employing appropriate settings for the at least one operating parameter of the wind turbine.

Alternatively or additionally the at least one operating parameter of the wind turbine may be modified by a modification value which is a function of a difference between the minimum operating temperature margin and the predefined threshold operating temperature margin. This has an advantage in that the control operation based on the operating temperatures of the components can e.g. be set to have less influence on the operation of the wind turbine when the difference is still comparatively high and to change the setting of the operating parameter more aggressively when the difference is small and one or more components are approaching their maximum allowable operating temperature.

The at least one operating parameter of the wind turbine may also be modified by a modification value which is a function of the component of the wind turbine to which the minimum operating temperature margin corresponds. For example, it may be known that the operating temperature of a specific component varies comparatively slowly while that of another component may vary at a greater speed. In such a case the modification value may be chosen to be greater for the component whose operating temperature may change quickly and smaller for the component whose operating temperature changes slowly, i.e. the control operation can be set to be more aggressive the faster the operating temperature of a component may change. An example of a component with a slowly changing operating temperature would be the bearing of the rotor. An example of a component with an operating temperature that varies quickly would be the power converter of the wind turbine. Accordingly the bearing would be assigned a smaller modification value than the power converter (or to the respective operating temperature margins).

Determining a minimum operating temperature margin may include a step of normalising the operating temperature margins. Normalisation of the operating temperature margins may be useful where the maximum allowable operating temperatures of different components are different from each other. In such a case the different operating temperature margins can be normalised using the specific maximum allowable operating temperature of each component for normalising the respective operating temperature margin. For example, an operating temperature margin of 10 degrees Celsius should be considered smaller if it was determined for a component having a very high maximum allowable operating temperature than if it was determined for a component having a low maximum allowable operating temperature because relatively speaking in the first case the respective component would be much closer to its maximum allowable operating temperature than in the latter case. Another advantage of embodiments of the invention including the normalisation is that the transient waveform of the determined minimum operating temperature margin will behave more steadily even if the minimum operating temperature margin will be determined for different components in the course of time.

The wind turbine may be shut down when the minimum operating temperature margin is less than a predetermined alarm threshold value. Shutting down the wind turbine may be used as a last resort when the operating temperature of a component does not respond to the control operation. The present invention overcomes the need of shutting down the wind turbine for most situations. However, if the operating temperature of a component continues to increase despite the control operations taken, a malfunction may be assumed. In such a case it will usually be the best choice to shut down the wind turbine for maintenance. The alarm threshold value may be zero degrees Celsius or even a negative temperature value which means that the wind turbine will be shut down when the operating temperature of one component of the wind turbine reaches or exceeds its maximum allowable operating temperature.

A second aspect provides a wind turbine including a plurality of components each of which comprising a corresponding temperature sensor adapted to measure an operating temperature of the corresponding component. The temperature sensors are connected to a control unit which is adapted to carry out the described control method.

BRIEF DESCRIPTION OF THE DRAWINGS

The claimed invention will be better understood from the following drawings in which a preferred embodiment of the invention will be illustrated by way of example. In the drawings:

FIG. 2 shows a flow chart of an embodiment of the claimed method.

FIG. 3 shows an embodiment of a controller adapted to carry out the claimed method.

DETAILED DESCRIPTION OF THE DRAWINGS

Figure 1:
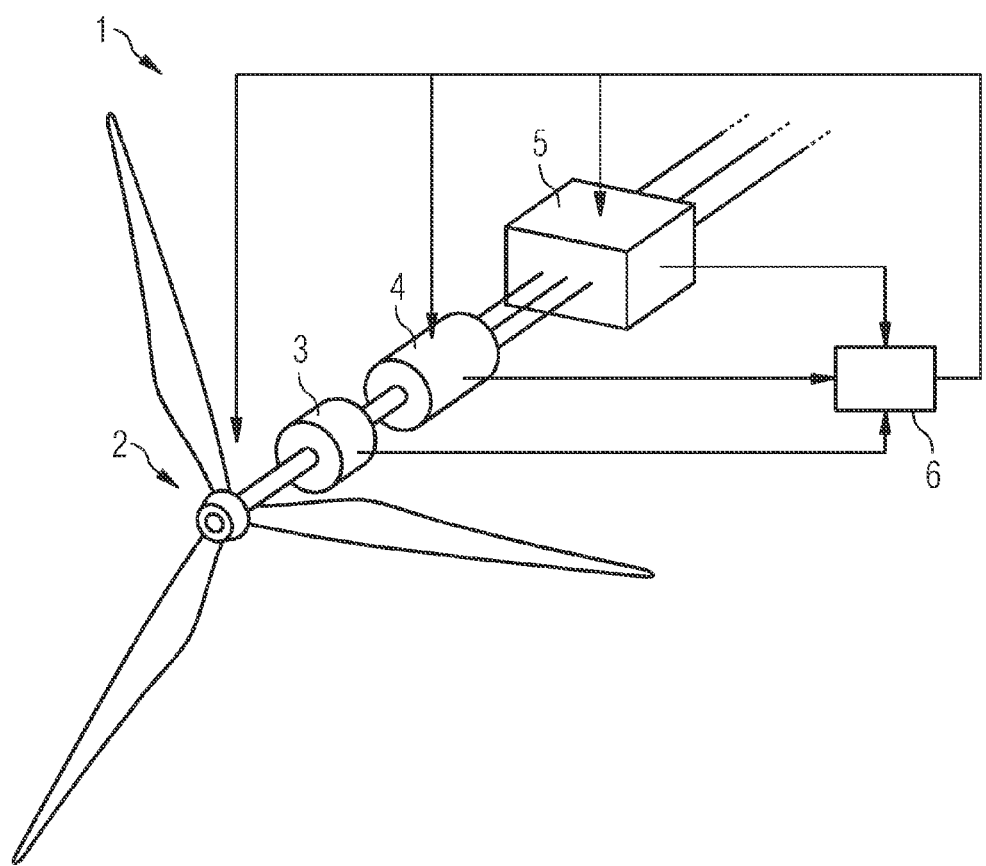
FIG. 1 shows a wind turbine according to the present claimed invention.

FIG. 1 shows a wind turbine 1. A rotor 2 of the wind turbine converts kinetic power provided by the wind into rotational power. A rotor shaft of the rotor 2 is borne by a bearing 3 and connected to an electric generator 4 which converts the rotational power into electric power. The electric power generated by the electric generator 4 is received by a power converter 5 which in a first step converts the electric power from an alternating current into a direct current. In a second step the power converter 5 converts the direct current into an alternating current having a frequency and amplitude suitable for feeding the electric power harvested by the wind turbine into a power grid. In the example of FIG. 1, the bearing 3, the electric generator 4 and the power converter 5 are equipped with corresponding temperature sensors which are adapted to measure the operating temperature of the respective component of the wind turbine. The measured operating temperatures are provided to a control unit 6 which is adapted to carry out the method of the invention. The control unit 6 can set an operating parameter of the wind turbine in accordance with the measured operating temperatures. For example, the control unit 6 can change a power setpoint of the wind turbine in order to keep the operating temperatures in their respective allowable intervals. More specifically the control unit 6 can change at least one of a pitch angle of the rotor 2, a rotations-per-minute or torque setting of the electric generator 4 or a frequency, phase or amplitude setting of the power converter 5.

FIG. 2 shows a flow chart of an embodiment of the method which may be carried out by the control unit 6 of the wind turbine shown in FIG. 1. The method starts in a step S0 and continues with a first step S1 in which the operating temperatures in a plurality of components of the wind turbine 1 are measured. In a subsequent step S2 the measured operating temperatures are subtracted from a corresponding predefined maximum allowable operating temperature for the respective component of the wind turbine. In step S3, a minimum operating temperature margin is determined among the results of the subtraction operation in the preceding step S2. This minimum operating temperature margin identifies the component of the wind turbine which is closest to its maximum allowable operating temperature. Furthermore, the minimum operating temperature margin conveys information about how close the component is to reaching its maximum allowable operating temperature. These pieces of information are then used in a step S4 of setting at least one operating parameter of the wind turbine in accordance with the minimum operating temperature margin. Preferably the method repeats by branching back to step S1.

FIG. 3 shows an embodiment of a controller adapted to carry out the method. The controller may be implemented as part of the control unit 6 of FIG. 1. A plurality of measured operating temperatures is provided to an equal number of sub-tractors 10-1, 10-2, . . . , 10-$n$ which subtract the measured operating temperature from a maximum allowable operating temperature for the corresponding component in which the respective operating temperature has been measured. The results of the subtraction are provided to an arithmetic unit 11 which determines a minimum value among its input values and provides the minimum value to an optional low-pass filter 12 which is provided to smooth the signal provided by the arithmetic unit 11. The low-pass filtered minimum value is then provided to an operator unit 13 which is adapted to adjust at least one operating parameter of the wind turbine in accordance with the received minimum value to thereby maintain the operating temperatures of the various components within their respective allowable regions.

Although the invention has been shown and described with respect to exemplary embodiments thereof, various other changes, omissions, and additions in form and detail thereof may be made therein without departing from the spirit and scope of the invention.

While the invention has been described in connection with a preferred embodiment, it is not intended to limit the scope of the invention to the particular form set forth, but on the contrary, it is intended to cover such alternatives, modifications, and equivalents as may be included within the scope of the invention as defined by the appended claims.

The invention claimed is:

1. A method of operating a wind turbine, comprising:
    measuring an operating temperature in a plurality of components of the wind turbine yielding a plurality of measured operating temperatures;
    subtracting each measured operating temperature from a predefined maximum allowable operating temperature for the corresponding component of the wind turbine thereby yielding a plurality of operating temperature margins;
    determining a minimum operating temperature margin among the plurality of operating temperature margins; and
    setting at least one operating parameter of the wind turbine in accordance with the minimum operating temperature margin.

2. The method as claimed in claim 1, further comprising:
    low-pass filtering the minimum operating temperature margin prior to setting the at least one operating parameter of the wind turbine.

3. The method as claimed in claim 1, wherein the at least one operating parameter of the wind turbine includes a power setpoint of the wind turbine.

4. The method as claimed in claim 1, further comprising:
    comparing the minimum operating temperature margin to a predefined threshold operating temperature margin and setting the at least one operating parameter of the wind turbine in accordance with a result of the comparison.

5. The method as claimed in claim 4, wherein the at least one operating parameter of the wind turbine is modified if the minimum operating temperature margin decreases below the predefined threshold operating temperature margin and left unchanged else.

6. The method as claimed in claim 4, wherein the at least one operating parameter of the wind turbine is modified by a modification value which is a function of a difference between the minimum operating temperature margin and the predefined threshold operating temperature margin.

7. The method as claimed in claim 4, wherein the at least one operating parameter of the wind turbine is modified by a modification value which is a function of the component of the wind turbine to which the minimum operating temperature margin corresponds.

8. The method as claimed in claim 1, wherein determining a minimum operating temperature margin includes a step of normalising the operating temperature margins.

9. The method as claimed in claim 1, wherein the wind turbine is shut down when the minimum operating temperature margin is less than a predetermined alarm threshold value.

10. A wind turbine, comprising:
    a plurality of components, each component comprising a temperature sensor configured to measure an operating temperature of the component,
    a control unit, wherein each temperature sensor is connected to the control unit configured to carry out a method of operating the wind turbine, comprising:
        measuring an operating temperature in a plurality of components of the wind turbine yielding a plurality of measured operating temperatures;
        subtracting each measured operating temperature from a predefined maximum allowable operating temperature for the corresponding component of the wind turbine thereby yielding a plurality of operating temperature margins;
        determining a minimum operating temperature margin among the plurality of operating temperature margins; and
        setting at least one operating parameter of the wind turbine in accordance with the minimum operating temperature margin.

\* \* \* \* \*